United States Patent
Iizuka (10) Patent No.: US 7,627,485 B2
(45) Date of Patent: Dec. 1, 2009

(54) CLIENT COMPUTER HAVING SOFTWARE INCLUDING A PLURALITY OF FUNCTIONS, SERVER COMPUTER, SYSTEM INCLUDING BOTH, CONTROL METHOD OF THEM, RECORD MEDIUM STORING PROGRAM READABLY BY COMPUTER FOR IMPLEMENTING CONTROL METHOD

(75) Inventor: Toshiaki Iizuka, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 1051 days.

(21) Appl. No.: 10/017,027

(22) Filed: Dec. 14, 2001

(65) Prior Publication Data

US 2002/0087489 A1 Jul. 4, 2002

(30) Foreign Application Priority Data

Dec. 28, 2000 (JP) ............................. 2000-403266
Nov. 30, 2001 (JP) ............................. 2001-366556

(51) Int. Cl.
*G06Q 99/00* (2006.01)
(52) U.S. Cl. ......................................................... 705/1
(58) Field of Classification Search ................... 705/1
See application file for complete search history.

(56) References Cited

U.S. PATENT DOCUMENTS

| | | | |
|---|---|---|---|
| 6,216,113 B1 * | 4/2001 | Aikens et al. ................. 705/34 |
| 6,249,836 B1 * | 6/2001 | Downs et al. ............... 710/268 |
| 6,317,878 B1 | 11/2001 | Saito | |
| 6,434,343 B1 * | 8/2002 | Kobayashi et al. ............. 399/8 |
| 6,516,304 B1 * | 2/2003 | Yoshimura .................... 705/52 |
| 6,704,419 B1 | 3/2004 | Sakajiri | |
| 6,772,191 B1 * | 8/2004 | Kurosawa et al. ........... 709/203 |
| 6,947,995 B2 * | 9/2005 | Chang et al. ................. 709/231 |
| 6,996,555 B2 * | 2/2006 | Muto et al. ..................... 707/3 |
| 2001/0038462 A1 * | 11/2001 | Teeuwen et al. ........... 358/1.15 |
| 2002/0069176 A1 * | 6/2002 | Newman ...................... 705/53 |
| 2002/0107817 A1 * | 8/2002 | Nakajima .................... 705/400 |
| 2002/0112171 A1 * | 8/2002 | Ginter et al. ................ 713/185 |

FOREIGN PATENT DOCUMENTS

| | | |
|---|---|---|
| JP | 10-097420 A | 4/1998 |
| JP | 11-341566 A | 12/1999 |
| JP | 2000053167 A | 2/2000 |

OTHER PUBLICATIONS

The above references were cited in a Jul. 15, 2008 Japanese Office Action issued in the counterpart Japanese Patent Application 2001-366556.

* cited by examiner

*Primary Examiner*—Jonathan Ouellette
(74) *Attorney, Agent, or Firm*—Cowan, Liebowitz & Latman, P.C.

(57) ABSTRACT

A client computer installs a plurality of functions in advance, and the client computer accesses a server computer to inform a function desired to be used to the server computer. The server computer charges the price of the informed function to a user, and transmits the fact to the client computer. By removing the function limitation of the charged function, the client computer becomes possible to use the function. Consequently, because the user can use a necessary function by paying only the price of the function, the user can save the costs of the use. Moreover, because the user is not required to download a new function, the user can save time.

10 Claims, 11 Drawing Sheets

CLIENT COMPUTER HAVING SOFTWARE INCLUDING A PLURALITY OF FUNCTIONS, SERVER COMPUTER, SYSTEM INCLUDING BOTH, CONTROL METHOD OF THEM, RECORD MEDIUM STORING PROGRAM READABLY BY COMPUTER FOR IMPLEMENTING CONTROL METHOD

BACKGROUND OF THE INVENTION

1. Field of the Invention

The present invention relates to a client computer, a server computer, a system including both of them, a control method of them, and a record medium storing a program readably by a computer for implementing the control method.

2. Description of the Related Art

The charging of a price for the use of software is conventionally performed on the basis of a unit price of packaged software. That is, there are many cases where the charging of a price for the use of software is performed as the selling price of packaged software capable of executing a plurality of functions. Although the cases where software is sold through the Internet come to increase as the Internet becomes popular in recent years, the charging is performed by the selling price as packaged software even in such a case.

However, in the conventional charging method, when using software by adding a new function, a user has to pay the selling price of the software itself including the added new function, and has to re-install the software itself. Moreover, when using software, which was bought through a web site on the Internet, by adding a new function, a user has to download the software itself including the added new function from a web site, and then the user has to spend time and costs for the downloading.

SUMMARY OF THE INVENTION

One object of the invention is to perform charging automatically without troubling a user when a new function is added to software and to decrease time and costs at that time in an embodiment of the present invention.

Other objects and features of the invention will be apparent from the following description and drawings.

DESCRIPTION OF THE PREFERRED EMBODIMENTS

Hereinafter, a client/server system according to an embodiment of the present invention is described in detail by the use of the attached drawings.

First Embodiment

Figure 1:
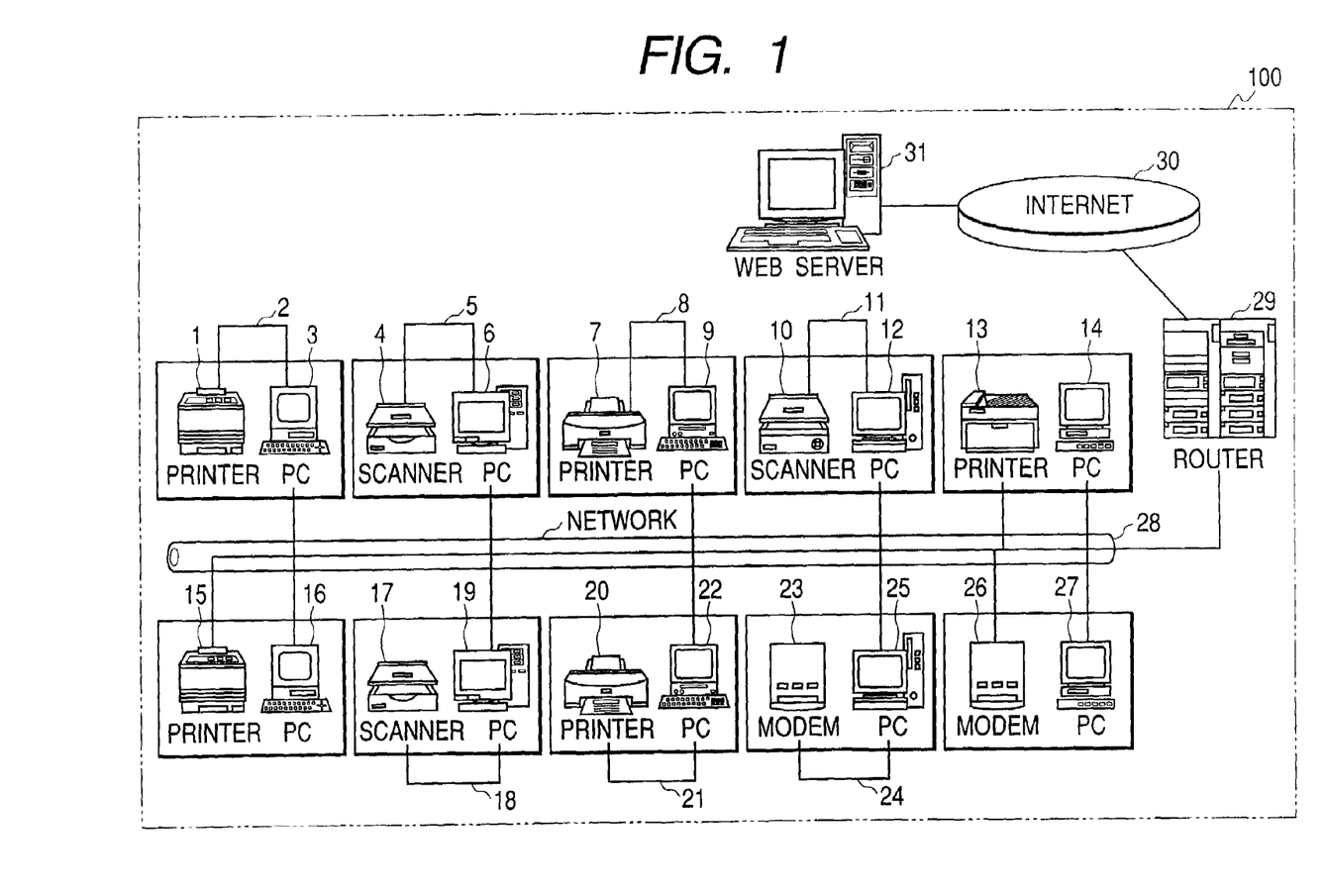
FIG. 1 is a block diagram of a network of a client/server system of an embodiment of the present invention.

FIG. 1 is a block diagram of the network of a client/server system according to an embodiment of the present invention.

In the client/server system 100 of FIG. 1, a web server 31 as a server computer is connected with a network 28 through a router 29 and the Internet 30.

The network 28 is directly connected with personal computers (hereinafter referred to as PC's) 3, 6, 9, 12, 14, 16, 19, 22, 25 and 27, printers 13 and 15, and a modem 26. The PC's 3, 6, 9, 12, 19, 22 and 25 are respectively connected with a printer 1, a scanner 4, a printer 7, a scanner 10, a scanner 17, a printer 20 and a modem 23 through signal lines 2, 5, 8, 11, 18, 21 and 24.

Figure 2:
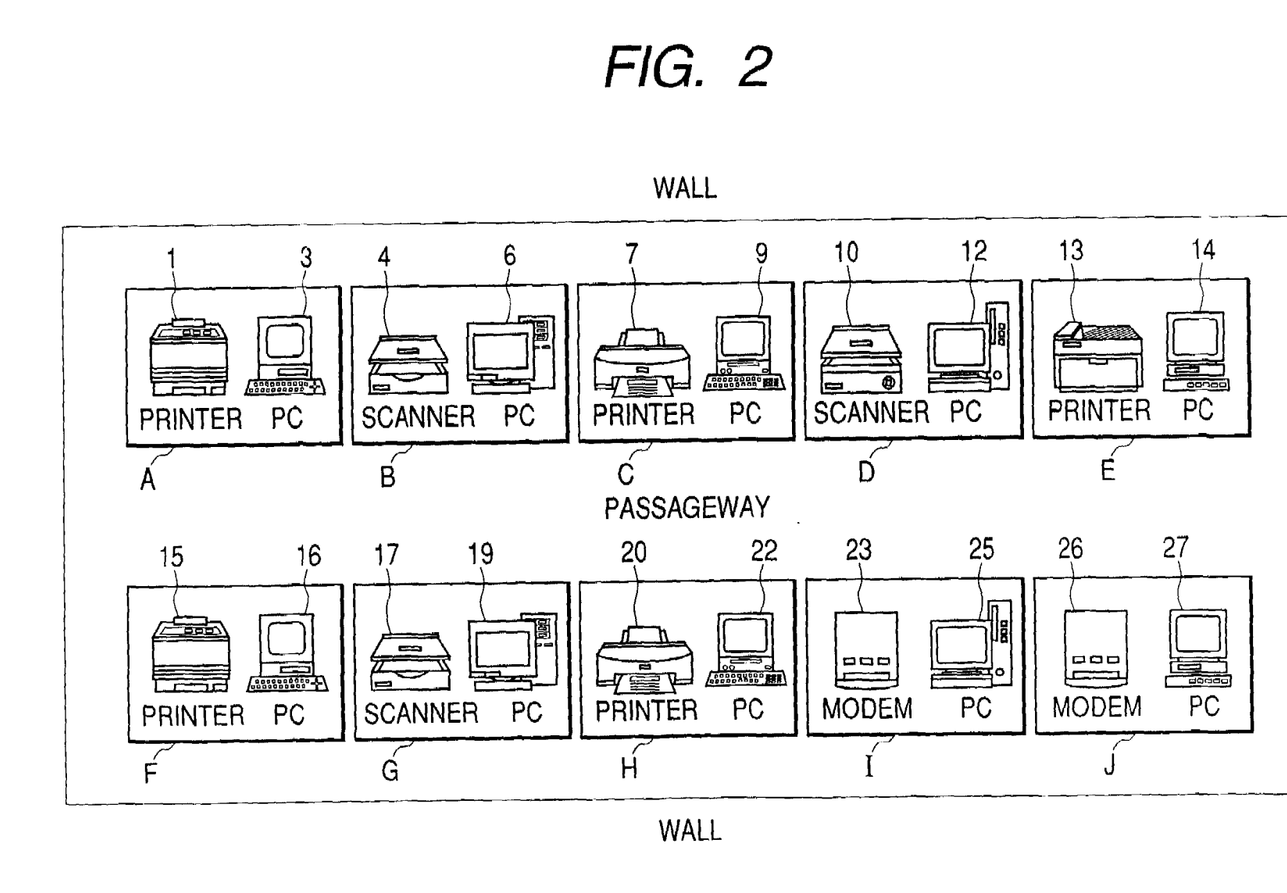
FIG. 2 is a diagram showing an office layout of the client/server system 100 of FIG. 1.

FIG. 2 is a diagram showing an office layout of the client/server system 100 of FIG. 1.

In the office layout of FIG. 2, five groups A, B, C, D and E and five groups F, G, H, I and J are disposed on both sides of a passageway. To put it concretely, the printer 1 and the PC 3 are disposed in the group A; the scanner 4 and the PC 6 are disposed in the group B; the printer 7 and the PC 9 are disposed in the group C; the scanner 10 and the PC 12 are disposed in the group D; and the printer 13 and the PC 14 are disposed in the group E. Moreover, on the opposite side of the passageway, the printer 15 and the PC 16 are disposed in the group F; the scanner 17 and the PC 19 are disposed in the group G; the printer 20 and the PC 22 are disposed in the group H; the modem 23 and the PC 25 are disposed in the group I; and the modem 26 and the PC 27 are disposed in the group J.

Figure 3:
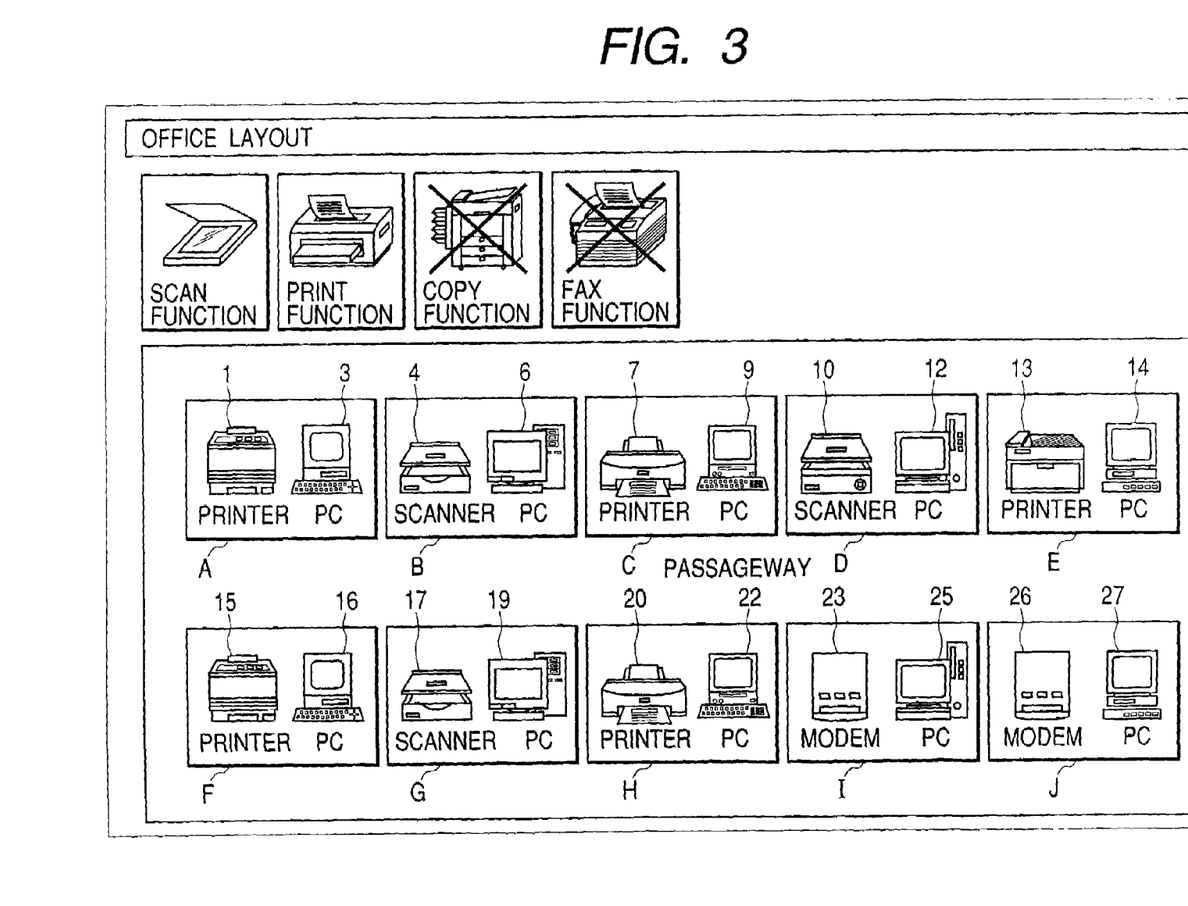
FIG. 3 is a diagram showing a graphical user interface in the client/server system 100 of FIG. 1.

FIG. 3 is a diagram showing a graphical user interface in the client/server system 100 of FIG. 1.

The graphical user interface of FIG. 3 shows the office layout of FIG. 2, and the graphical user interface is set to be displayed on any computer as long as they are directly connected with the network 28. That is, any of the PC's 3, 6, 9, 12, 14, 16, 19, 22, 25 and 27 can display the office layout of FIG. 2 by the graphical user interface.

A user controls each equipment such as the printer 1 described above. In this case, there are cases, in one of which a computer displaying the graphical user interface is the same computer that actually performs the control of each equipment described above (hereinafter, the computer is referred to as a "client computer"), and in the other of which they are different ones.

There are four buttons indicating a "scan function", a "print function", a "copy function" and a "fax function" on the upper part in the graphical user interface of FIG. 3. These buttons severally indicate the following functions.

That is, the scan function is a function to transmit an image read with a scanner to a PC; the print function is a function to print out a file on a PC with a printer; the copy function is a function to print out an image read by a scanner with a printer; and the fax function is a function to transmit a file on a PC by facsimile through a modem.

Incidentally, a computer displaying the graphical user interface makes the flag of a usable function on the graphical user interface at that time to indicate an enabled state, and makes the flag of an unusable function to indicate a disabled state. In the present embodiment, in the initial state, the flags of only the scan function and the print function are made to indicate the enabled state, and the flags of the copy function and the fax function are made to indicate the disabled state.

Furthermore, as shown in FIG. 3, x marks are given to the buttons indicating the functions having flags indicating the disabled state among the four buttons at the upper part of the graphical user interface described above. The x marks are automatically given to the buttons indicating the functions having the flags the indications of which have changed from the enabled state to the disabled state, and the x marks are automatically removed from the buttons indicating the functions having the flags that have changed their indications from the disabled state to the enabled state. Consequently, a user can know which functions are now usable on the graphical user interface at a glance.

Figure 5:
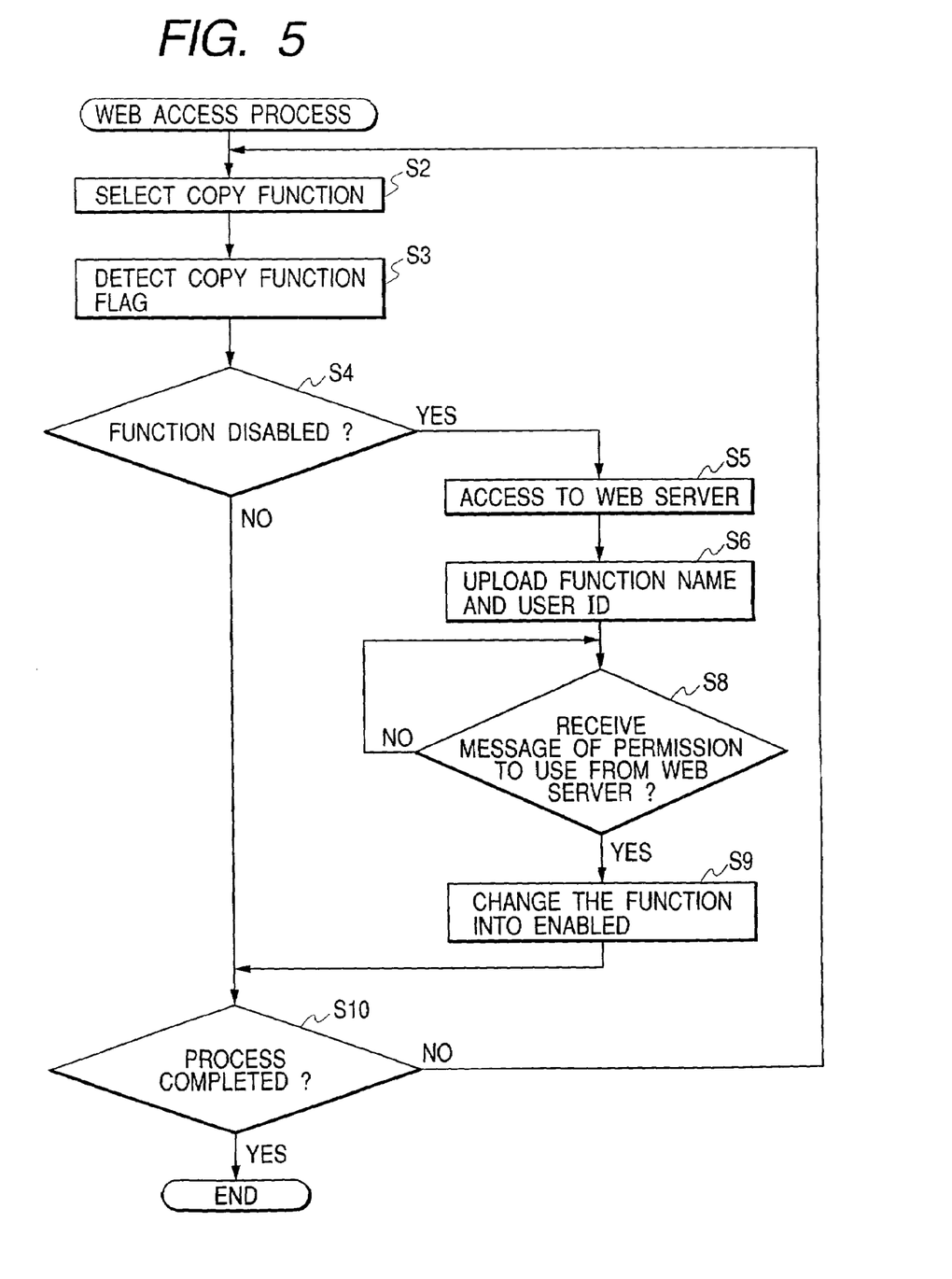
FIG. 5 is a flowchart showing the web access processing of a client computer when a copy function is added.

FIG. 5 is a flowchart showing the web access process of a client computer when a copy function is added as a usable function.

In the present embodiment, any one of the PC's 3, 6, 9, 12, 14, 16, 19, 22, 25 and 27 is suitably selected by user's designation or a predetermined network managing program as a client computer and a computer for displaying the aforesaid graphical user interface, severally. Incidentally, the client computer uses the software that has previously installed all functions including functions to be added as a usable function. Moreover, the removal of a X mark among the x given buttons in the aforesaid four buttons at the upper part of the graphical user interface in conformity with the following processing indicates the addition of the function as a usable function on the graphical user interface. Furthermore, although descriptions are given to a case where the copy function is added to be a usable function in the present embodiment, the cases where any of the aforesaid scan function, the print function and the fax function is added are the same.

Figure 4:
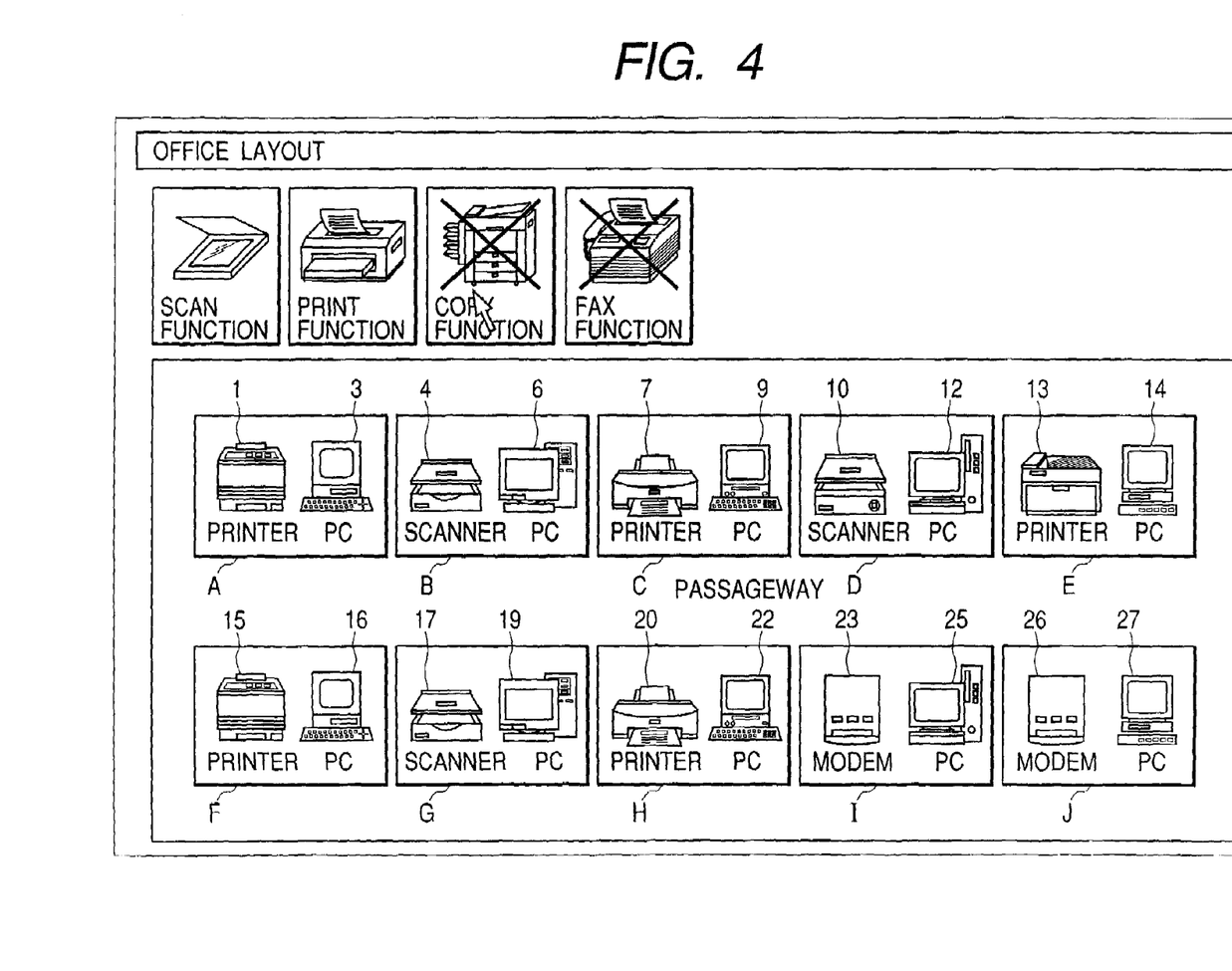
FIG. 4 is a diagram showing the graphical user interface in the client/server system 100 of FIG. 1.

At first, in the client computer, the button indicating the copy function is selected among the four buttons at the upper part of the graphical user interface shown in FIG. 4 by a user with a pointing device (Step S2). Then, the client computer detects the flag indicating the copy function selected by the user (Step S3).

The client computer judges whether the flag indicates the disabled state or not as a result of the flag detection at Step S3. When the flag does not indicate the disabled state, namely when the flag indicates the enabled state, the client computer executes the processing at Step S10 which will be described later. On the other hand, when the flag indicates the disabled state, the client computer judges that the user has an intention of paying the price for obtaining the permission for the use of the copy function to access a function addition uniform resource locator (hereinafter referred to as "URL") (Step S5), and then the client computer uploads the name of the function (copy function) and the user identification data (hereinafter referred to as "ID") to the web server 31 (Step S6). Incidentally, the "function addition URL" is a URL indicating a place in the Internet in the inside of the web server 31.

After the web server 31 has executed the process of FIG. 6 that will be described later, the client computer receives a transmission of permission to use the copy function from the web server 31 (Step S8). Then, the client computer changes the indication of the flag of the copy function from the disabled state to the enabled state, and further the client computer removes the x mark on the button indicating the copy function on the graphical user interface as shown in FIG. 7 (Step S9). Consequently, the user can identify whether the web server 31 permitted to use the copy function or not with the graphical user interface, and at the same time the user can identify the execution of charging for the copy function by the web server 31.

At Step S10, the client computer judges whether the processing of other additional functions has ended or not. When the processing has not ended yet, the client computer similarly executes the aforesaid processing at Step S2 and subsequent Steps with regard to the other additional functions, and completes the present process after the execution of the processing.

Figure 6:
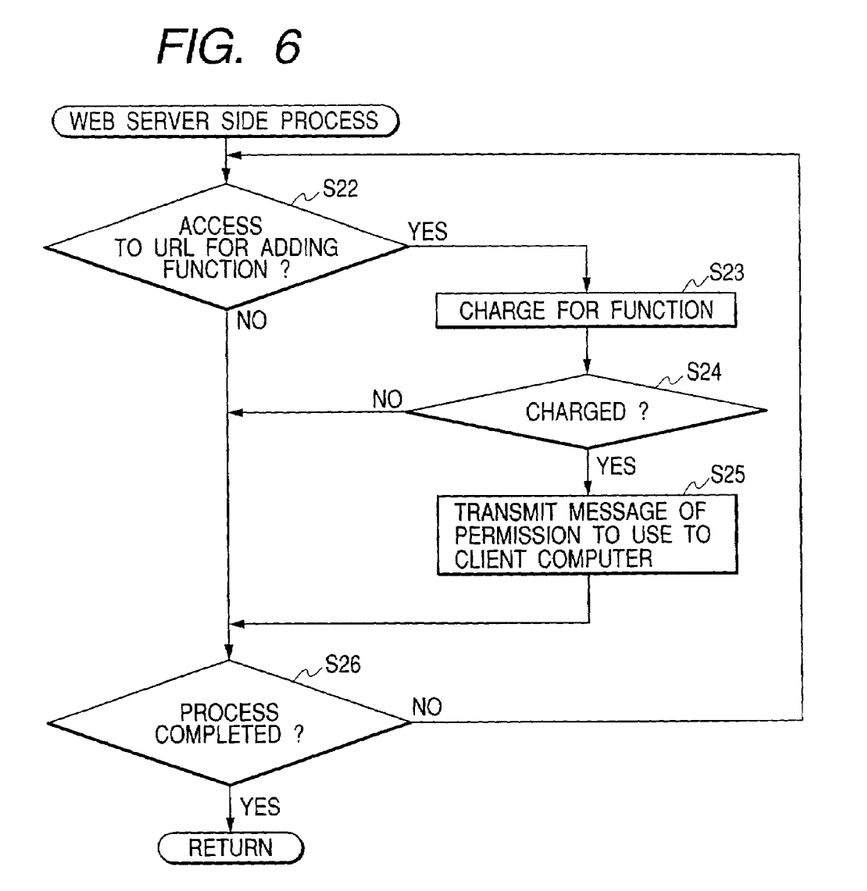
FIG. 6 is a flowchart of a process on the side of a web server corresponding to Step S6 and Step S8 in FIG. 5.
Figure 7:
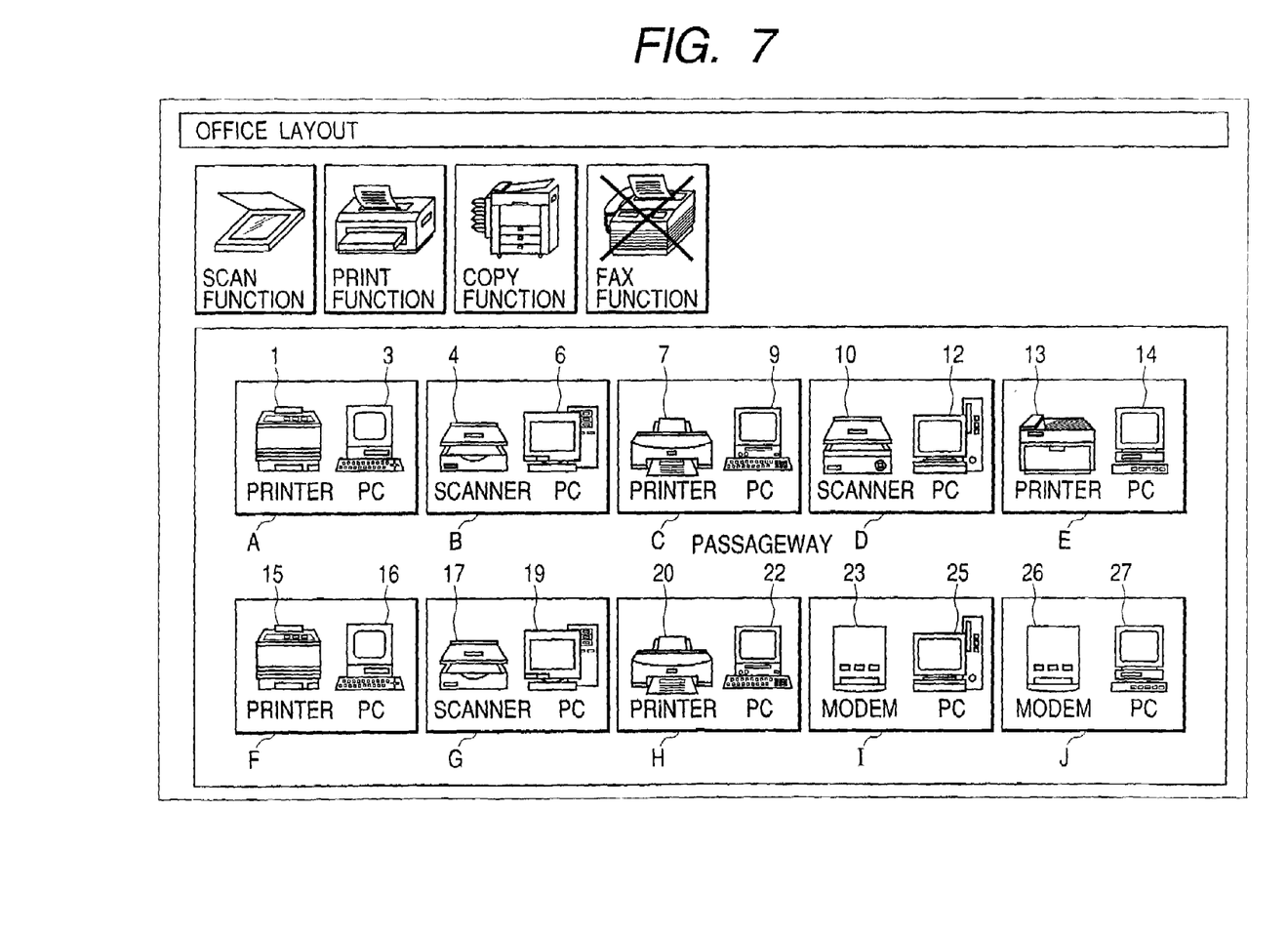
FIG. 7 is a diagram showing the graphical user interface in the client/server system 100 of FIG. 1.

FIG. 6 is a flowchart of a process on the side of the web server 31.

The web server 31 judges whether the user ID and the name of the function were uploaded or not when the client computer accessed the function addition URL (Step S22). When it was judged that the access had not been executed as a result of the judgment at Step S22, the web server 31 executes the processing at Step S26 that will be described later. On the other hand, when it was judged that the access had been executed as the result of the judgment at Step S22, the web server 31 charges the price for the permission to use the function uploaded from the client computer to the user corresponding to the user ID uploaded from the same client computer (Step S23).

Next, the web server 31 judges whether the charging required to the client computer at Step S23 was executed or not (Step S24). When it was judged that the charging did not executed at Step S24, the web server 31 executes the processing at Step S26 that will be described later. On the other hand, when it was judged that the charging executed at Step S24, the web server 31 transmits the permission for use to the client computer (Step S25).

At Step S26, the web server 31 judges whether the processing of other additional functions has ended or not. When the processing has not ended yet, the web server 31 similarly executes the aforesaid processing at Step S22 and subsequent Steps with regard to the other additional functions, and completes the present process after the execution of the processing.

According to the processes shown in FIG. 5 and FIG. 6, when the user has an intention of paying the price for the use of the copy function to the web server 31 though the user has not paid it yet (the case where the answer to the question at Step S4 in FIG. 5 is yes), the client computer accesses the function addition URL of the web server 31 (Step S5 in FIG. 5). Then, the price for the use of the copy function is charged by the web server 31 (Step S23 in FIG. 6). After that, by the transmission of the fact from the web server 31 (Step S25 in FIG. 6), it becomes possible that the client computer uses the copy function. Consequently, the user can automatically pay the price for the copy function without any trouble, and the time and the costs at the time of the addition of a function can be decreased.

Second Embodiment

Next, a charging system according to a second embodiment is described. Incidentally, in the second embodiment, although the charging for a function in the enabled state is performed by the month, when the function has not been used for one month or more, the charging for the function automatically stops.

Moreover, the configuration of the charging system of the second embodiment is the same as that of the fist embodiment described above.

Figure 8:
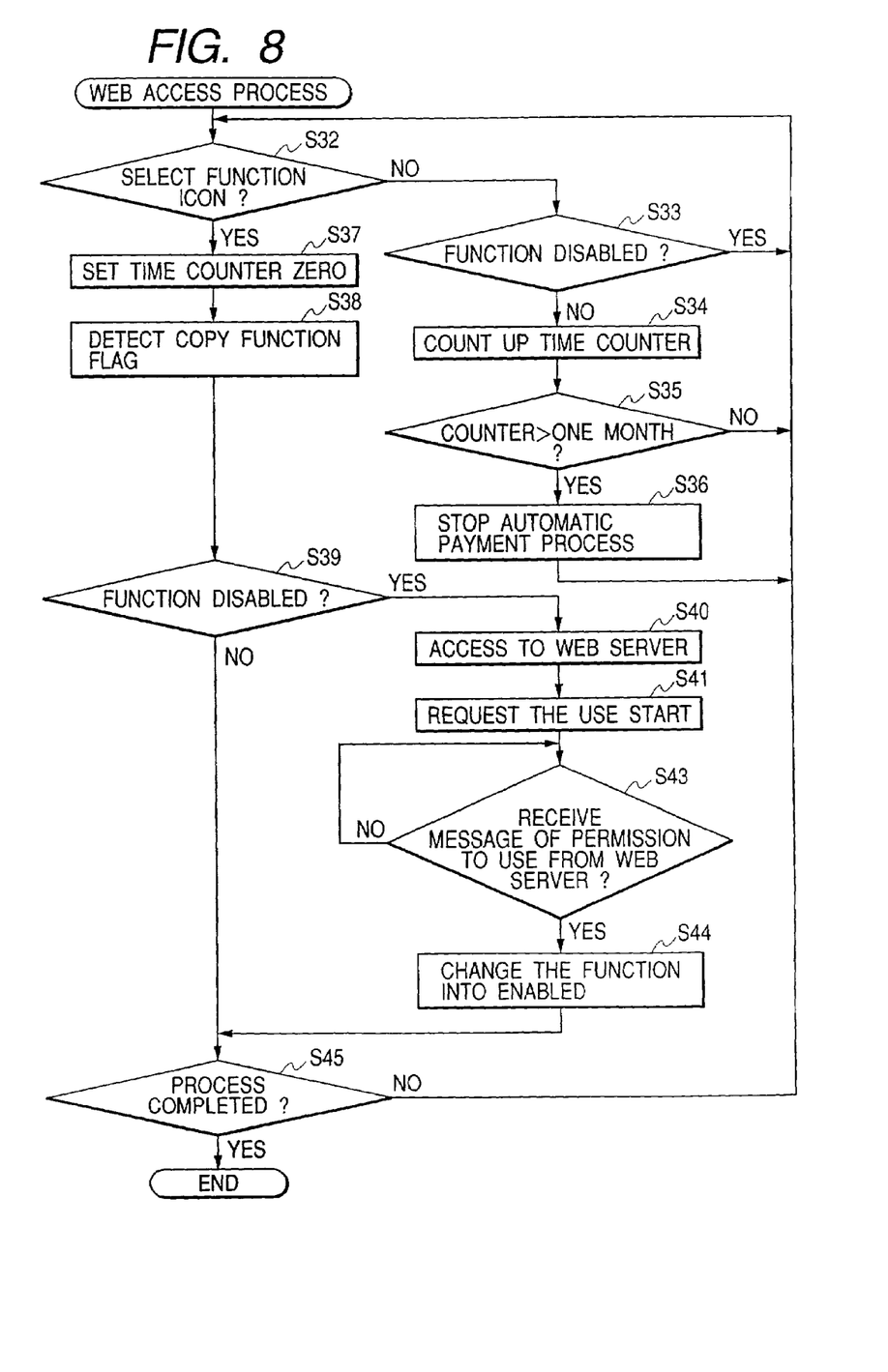
FIG. 8 is a flowchart showing a variant of the web access processing of a client computer when the copy function is added.

FIG. 8 is a flowchart showing the web access processing of a client computer when the copy function is added as a usable function. In the second embodiment, too, similarly to the process in FIG. 5 mentioned above, any one of the PC's 3, 6, 9, 12, 14, 16, 19, 22, 25 and 27 is suitably selected by user's designation or a predetermined network managing program as the computer for displaying the graphical user interface and the client computer, severally. Moreover, although descriptions are given to a case where the copy function is added to be a usable function in the present embodiment, the cases where any of the aforesaid scan function, the print function and the fax function is added are the same.

At first, in the client computer, the button indicating the copy function is selected among the four buttons at the upper part of the graphical user interface by a user with a pointing device (Step S32). Then, after the client computer sets the time counter for the copy function at zero (Step S37), the client computer detects the flag indicating the copy function (Step S38).

The client computer judges whether the flag indicates the disabled state or not as a result of the flag detection at Step S38 (Step S39). When the flag of the copy function does not indicate the disabled state, namely when the flag indicates the enabled state, the client computer executes the processing at Step S45. On the other hand, when the flag of the copy function indicates the disabled state, the client computer judges that the user has an intention of paying the price for obtaining the permission for the use of the copy function to access a function addition URL (Step S40).

Next, by transmitting the name of the function desired to be added as a usable function (copy function) and the user ID to the web server 31, the client computer requests the starting of the use of the desired function (Step S41).

After the web server 31 has executed the processing of FIG. 6 described above, the client computer receives a transmission of permission to use the copy function from the web server 31 (Step S43). Then, the client computer changes the indication of the flag of the copy function from the disabled state to the enabled state, and further the client computer removes the x mark on the button indicating the copy function on the graphical user interface as shown in FIG. 7 (Step S44).

At Step S45, the client computer judges whether the processing of other additional functions has ended or not. When the processing has not ended yet, the client computer similarly executes the aforesaid processing at Step S32 and subsequent Steps with regard to the other additional functions, and completes the present process after the execution of the processing.

On the other hand, no button of the four existing at the upper part of the graphical user interface of the client computer was selected by the user at Step S32, the client computer judges whether the flag of each button indicates the disabled state or not (Step S33). Then, the client computer counts up the time counter of the function being not in the disabled state, namely being in the enabled state (Step S34).

Next, the client computer judges whether the time counter of the function that was counted up at Step S34 has continued counting for more than one month or not (Step S35). As a result, when the time counter of the function has not continued counting for more than one month, the client computer executes the aforesaid processing at Step S32 and subsequent Steps. On the other hand, when the time counter of the function has continued counting for more than one month, the client computer executes the processing of the stopping of automatic payment of FIG. 9 that will be described later (Step S36).

Figure 9:
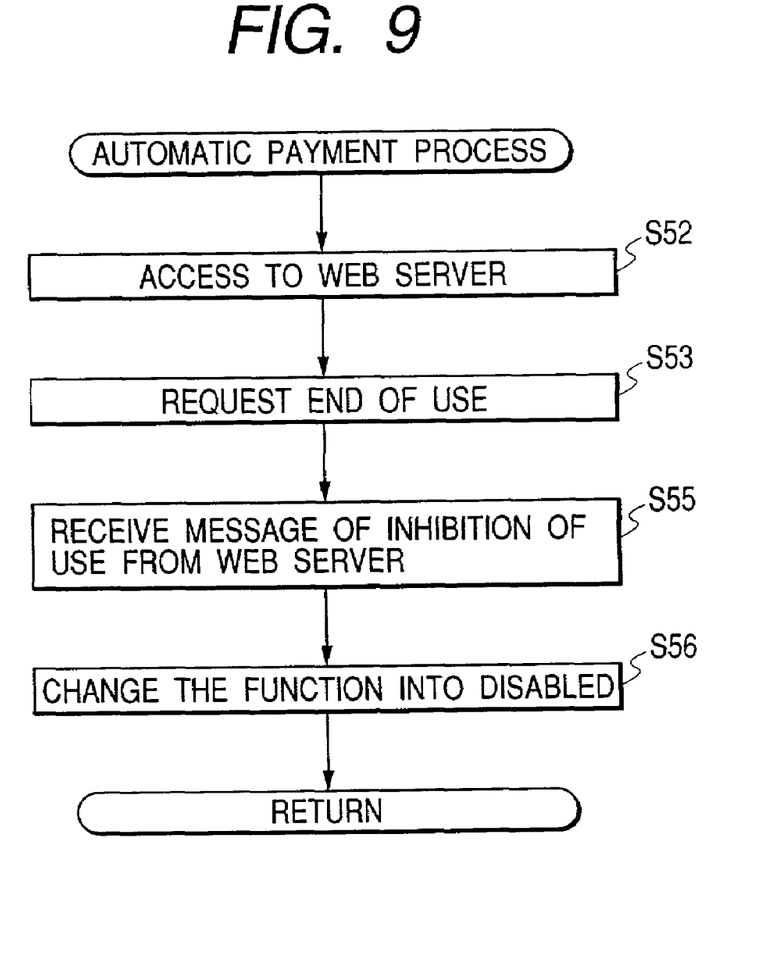
FIG. 9 is a flowchart of the process of the stop of automatic payment at step S36 in FIG. 8.

FIG. 9 is a flowchart of the processing of the stopping of automatic payment of the client computer at Step 36 in FIG. 8.

At first, the client computer accesses the function addition URL of the web server 31 (Step 52). Then, by transmitting the function name and the user ID of the function that has remained not being used for one month to the web server 31, the client server requests the end of the use of the function (Step S53).

After the web sewer 31 executed the processing of FIG. 10 that will be described later, the client computer receives the transmission of the inhibition of use from the web server 31 (Step S55). Then, the client computer changes the flag of the function from the enabled state to the disabled state, and further the client computer adds a x mark on the button indicating the copy function on the graphical user interface as shown in FIG. 11 (Step S56). Then, the client computer completes the present process.

By the process of FIG. 9, the user can automatically discontinue the payment of the price for the permission of the web server 31 to use the function that has remained and not been used for more than one month, and further the user can easily know the fact that it became impossible to use the function.

Incidentally, even if the user clicked an enabled function, the web server 31 judges that the user wants to end the function to execute the process of the stop of the automatic payment shown in FIG. 9, and thereby the user can terminate the charging to the function by the month.

Figure 10:
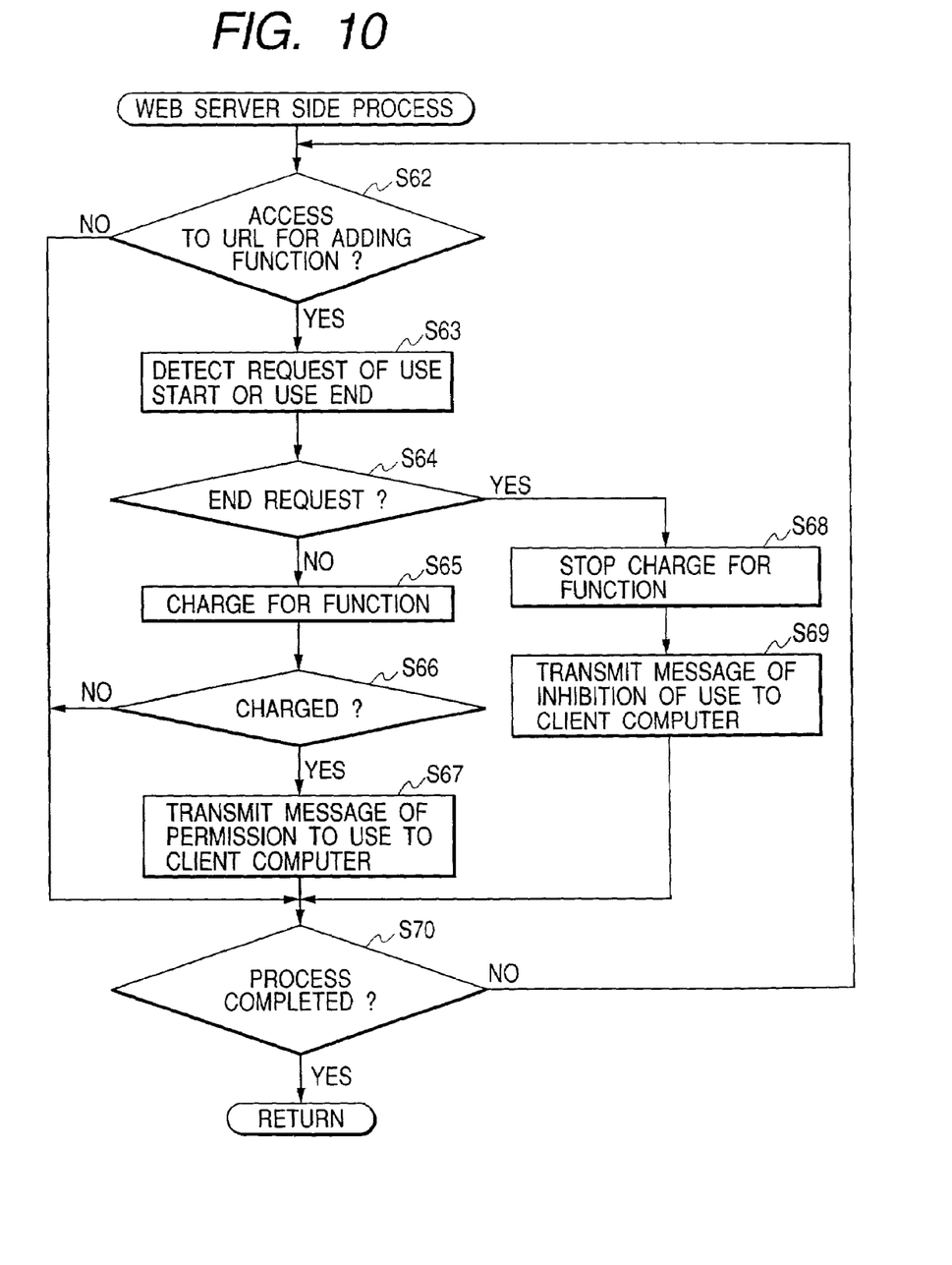
FIG. 10 is a flowchart of a process on a web server side corresponding to Step S53 and Step S55 in FIG. 9.
Figure 11:
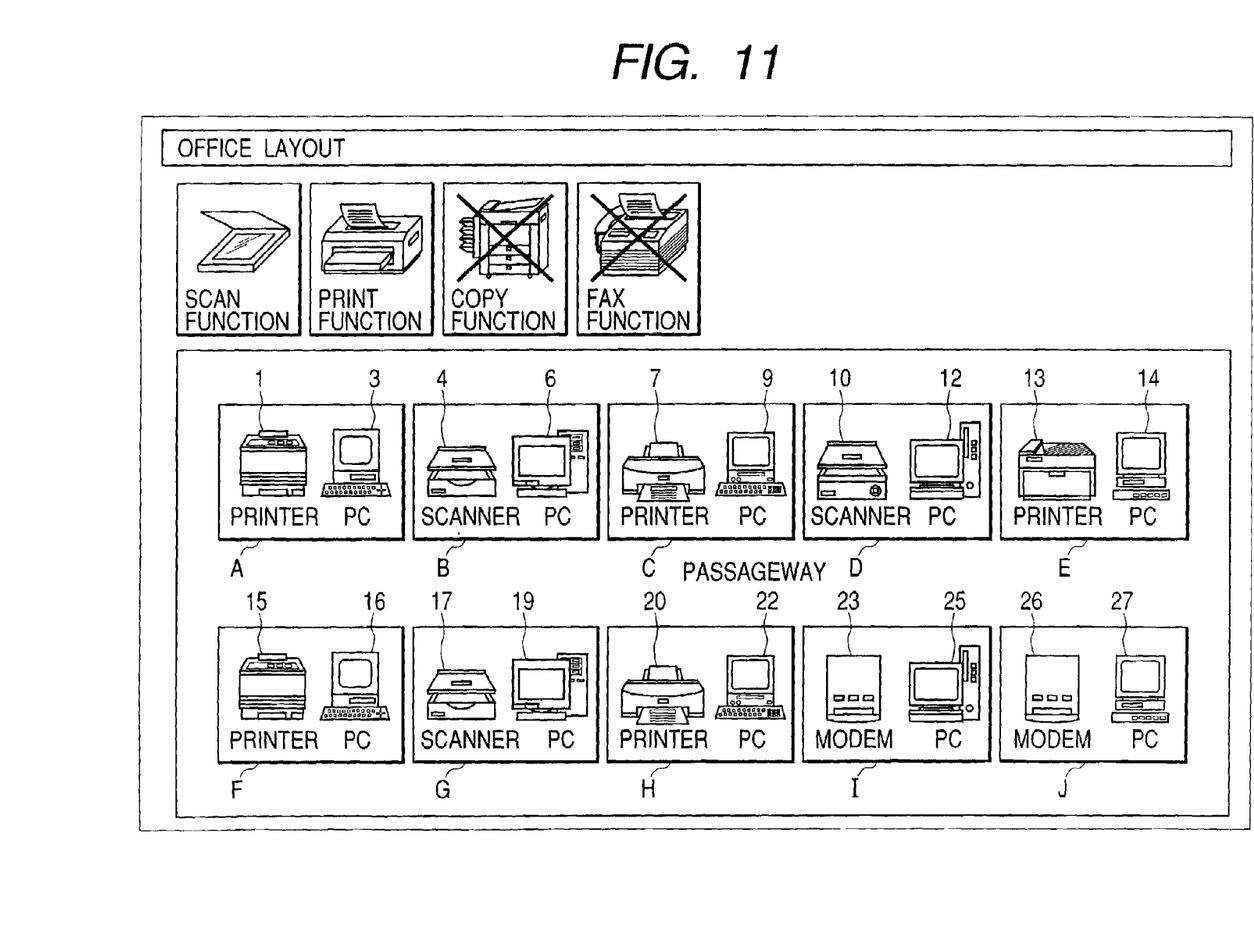
FIG. 11 is a diagram showing the graphical user interface in the client/server system of FIG. 8.

FIG. 10 is a flowchart of the process on the side of the web server 31 corresponding to Step S53 and Step S55 in FIG. 9.

The web server 31 detects the existence of access from the client computer to the function addition URL (Step S62), and the web server 31 detects which is a request from the client computer, the request for the start of use or the request for the end of use (Step S63).

Next, the web server 31 judges whether the request detected at Step S63 is the request for the end of use or not (Step S64). When it was judged that the request is not the request for the end of use, namely the request is the request for the start of use, as a result, the web server 31 charges a price for the permission to use the function desired to be used, which was uploaded from the client computer, to the user ID uploaded from the same client computer (Step S65).

Next, the web server 31 judges whether the charging was performed or not at Step S65 (Step S66). When the charging was not performed, the web server 31 ends the present process as it is. On the other hand, when the charging was performed, the web server 31 transmits the permission for use to the client computer (Step S67).

On the other hand, when it was judged that the request is the request for the end of use as the result of the judgment at Step S64, the web server 31 ends the charging of the function transmitted from the client computer (the function that has remained not being used for more than one month) by the month to the user corresponding to the user ID transmitted from the same client computer (Step S68), and the web server 31 transmits the inhabitation of the use of the function to the client computer (Step S69).

At Step S70, the web server 31 judges whether the processing of other additional functions has ended or not. When the processing has not ended yet, the web server 31 similarly executes the aforesaid processing at Step S62 and subsequent Steps with regard to the other additional functions, and completes the present process after the execution of the processing.

According to the processes shown in FIG. 8 to FIG. 10, when a month has passed while the user has remained not using the copy function and the user had paid the price for the use of the copy function (the case where the answer to the question at Step S35 in FIG. 8 is yes), the client computer accesses the function addition URL in the web server 31 (Step S52 in FIG. 9) to end the charging to the function remained and not being used for more than one month (the copy function) by the month (Step S68 in FIG. 10). Consequently, it can be prevented that the user unnecessarily pays the price for the function that has not been used.

Moreover, it is needless to say that the present invention can be applied to a case where the method for the automatic charging of the aforesaid embodiments is realized by the supply of the record medium storing a program module of the software for the execution of the method to a system or an apparatus. In this case, the program module reading from the record medium itself realizes the novel functions of the invention, and the record medium storing the programs constitutes the present invention.

The program module of the aforesaid each embodiment is severally stored in the web server 31, a computer displaying the graphical user interface, and a client computer. As the record medium storing the program module, the following recording media can be used: for example, a floppy disk, a hard disk, an optical disk, a photomagnetic disk, a CD-ROM, a CD-R, a DVD, a magnetic tape, a nonvolatile storage card, and the like.

Although the invention has been described in its preferred form with a certain degree of particularity, obviously many changes and variations are possible therein. It is therefore to be understood that the present invention may be practiced than as specifically described herein without departing from scope and the spirit thereof.

What is claimed is:

1. A client terminal in which a software including a plurality of functions is installed and which is capable of communicating with a server apparatus, the terminal comprising:
   a setting unit, which sets for each the plurality of functions an enabled-state flag indicating that the function is usable or a disabled-state flag indicating that the function is unusable, wherein the function with the enabled-state flag is to be subjected to charging;
   a payment unit, which executes, every first predetermined period, payment processing of a predetermined price of the function with the enabled-state flag set by said setting unit;
   a time count unit, which counts a period in which the function with the enabled-state flag remains unused;
   a prohibition request unit, which automatically requests the server apparatus to prohibit use of the function with the enabled-state flag which remains unused if the period counted by said time count unit exceeds a second predetermined period;
   a changing unit, which changes the enabled-state flag of the function which remains unused to the disabled-state flag in response to a response from the server apparatus to the request by said prohibition request unit;
   an icon display unit, which displays icons respectively corresponding to the plurality of functions such that each icon distinguishably shows whether the corresponding function is usable or unusable, in accordance with the enabled-state flag or the disabled-state flag set by said setting unit; and
   a permission request unit, which, in response to a user instruction, requests the server apparatus to permit use of the function with the flag changed from the enabled-state flag to the disabled-state flag by said changing unit,
   wherein, if said changing unit changes the enabled-state flag of the function which remains unused to the disabled-state flag, said icon display unit changes a display status of the icon for that function,
   wherein said changing unit changes the disabled-state flag of the function which remains unused to the enabled-state flag in response to a response from the server apparatus to the request by said permission request unit, and said payment unit executes the payment processing of the predetermined price of that function, and
   wherein said time count unit resets the period in which the function with the enabled-state flag remains unused when that function is used.

2. A terminal according to claim 1, wherein the function is at least one of a scan function, print function, a copy function and a facsimile transmission function.

3. A terminal according to claim 1, wherein the second predetermined period is determined in correspondence with the first predetermined period.

4. A terminal according to claim 1, wherein the predetermined price is determined for each function and must be paid for usage of the function.

5. A control method of client terminal in which a software including a plurality of functions is installed and which is capable of communicating with a server apparatus, said method comprising the step of:
   setting for each the plurality of functions an enabled-state flag indicating that the function is usable or a disabled-state flag indicating that the function is unusable, wherein the function with the enabled-state flag is to be subjected to charging;
   executing, every first predetermined period, payment processing of a predetermined price of the function with the enabled-state flag set in said setting step;
   counting a period in which the function with the enabled-state flag remains unused;
   automatically requesting the server apparatus to prohibit use of the function with the enabled-state flag which remains unused if the period counted in said counting step exceeds a second predetermined period;
   changing the enabled-state flag with the function which remains unused to the disabled-state flag in response to a response from the server apparatus to the request in said prohibition request step;
   displaying icons respectively corresponding to the plurality of functions such that each icon distinguishably shows whether the corresponding function is usable or unusable, in accordance with the enabled-state flag or the disabled-state flag set in said setting step; and
   requesting, in response to a user instruction, the server apparatus to permit use of the function with the flag changed from the enabled-state flag to the disabled-state flag in said changing step,
   wherein, if said changing step changes the enabled-state flag of the function which remains unused to the disabled-state flag, said displaying step changes a display status of the icon for that function,
   wherein said changing step changes the disabled-state flag of the function which remains unused to the enabled-state flag in response to a response from the server apparatus to the request in said requesting step, and said executing step executes the payment processing of the predetermined price of that function, and wherein said counting step resets the period in which the function with the enabled-state flag remains unused when that function is used.

6. A control method according to claim 5, wherein the second predetermined period is determined in correspondence with the first predetermined period.

7. A control method according to claim 5, wherein the predetermined price is determined for each function and must be paid for usage of the function.

8. A record medium storing a program readably by a computer for implementing a control method of client terminal in which a software including a plurality of functions is installed and which is capable of communicating with a server apparatus, said method comprising the step of:

setting for each the plurality of functions an enabled-state flag indicating that the function is usable or a disabled-state flag indicating that the function is unusable, wherein the function with the enabled-state flag is to be subjected to charging;

executing, every first predetermined period, payment processing of a predetermined price of the function with the enabled-state flag set in said setting step;

counting a period in which the function with the enabled-state flag remains unused;

automatically requesting the server apparatus to prohibit use of the function with the enabled-state flag which remains unused if the period counted in said counting step exceeds a second predetermined period;

changing the enabled-state flag with the function which remains unused to the disabled-state flag in response to a response from the server apparatus to the request in said prohibition request step;

displaying icons respectively corresponding to the plurality of functions such that each icon distinguishably shows whether the corresponding function is usable or unusable, in accordance with the enabled-state flag or the disabled-state flag set in said setting step; and requesting, in response to a user instruction, the server apparatus to permit use of the function with the flag changed from the enabled-state flag to the disabled-state flag in said changing step, wherein, if said changing step changes the enabled-state flag of the function which remains unused to the disabled-state flag, said displaying step changes a display status of the icon for that function, wherein said changing step changes the disabled-state flag of the function which remains unused to the enabled-state flag in response to a response from the server apparatus to the request in said requesting step, and said executing step executes the payment processing of the predetermined price of that function, and wherein said counting step resets the period in which the function with the enabled-state flag remains unused when that function is used.

9. A record medium according to claim 8, wherein the second predetermined period is determined in correspondence with the first predetermined period.

10. A record medium according to claim 8, wherein the predetermined price is determined for each function and must be paid for usage of the function.

* * * * *